United States Patent [19]

Henry et al.

[11] Patent Number: 4,750,511
[45] Date of Patent: Jun. 14, 1988

[54] FLUID PRESSURE SPOOL VALVE AND METHOD OF CONTROLLING PRESSURE FORCES ACTING THEREON

[75] Inventors: James P. Henry, Indianapolis; Albert A. Skinner, Anderson, both of Ind.

[73] Assignee: General Motors Corporation, Detroit, Mich.

[21] Appl. No.: 944,763

[22] Filed: Dec. 22, 1986

[51] Int. Cl.$^4$ .............................................. F15B 13/04
[52] U.S. Cl. .................. 137/14; 137/625.38; 137/625.68; 137/625.69; 251/282; 251/324; 251/325
[58] Field of Search ............... 137/14, 625.38, 625.68, 137/625.69; 251/324, 325, 282

[56] References Cited

U.S. PATENT DOCUMENTS

| | | | |
|---|---|---|---|
| 2,812,775 | 11/1957 | Hodgson | 137/625.69 |
| 2,996,078 | 8/1961 | Freeman et al. | 137/625.68 X |
| 3,525,500 | 8/1970 | Bender | 137/625.69 X |
| 3,643,700 | 2/1972 | Black | 137/625.68 |
| 4,114,857 | 9/1978 | Bondi | 251/324 |

FOREIGN PATENT DOCUMENTS

| | | | |
|---|---|---|---|
| 1081731 | 5/1960 | Fed. Rep. of Germany | 251/282 |
| 101172 | 6/1982 | Japan | 137/628.69 |
| 2165031 | 4/1986 | United Kingdom | 137/625.69 |

Primary Examiner—Gerald A. Michalsky
Attorney, Agent, or Firm—D. D. McGraw

[57] ABSTRACT

The velocity head created at an inlet port of a spool valve decreases the static pressure head at the inlet. The valve is so constructed that the decrease in static pressure can act on only a very small effective area of the land side surface, with a substantial majority of the land side surface effective area being so positioned that it is not subject to the velocity pressure head and its lesser static pressure head. Therefore the majority of the effective land side wall area is not exposed to the decrease static pressure head, but is exposed primarily to the full static pressure head with virtually no velocity pressure head, as the opposite land. This therefore decreases the force differential tending to urge the spool valve toward the closed position and therefore decreases the amount of force which must be overcome to move the spool valve in an opening direction. As a near balance of static pressures acting in opposite directions on the spool valve lands is obtained, there is less resistance to the valve apply force. This is accomplished by providing recessed land facing surfacing areas in one or both of the lands of a typical two-land spool valve.

9 Claims, 2 Drawing Sheets

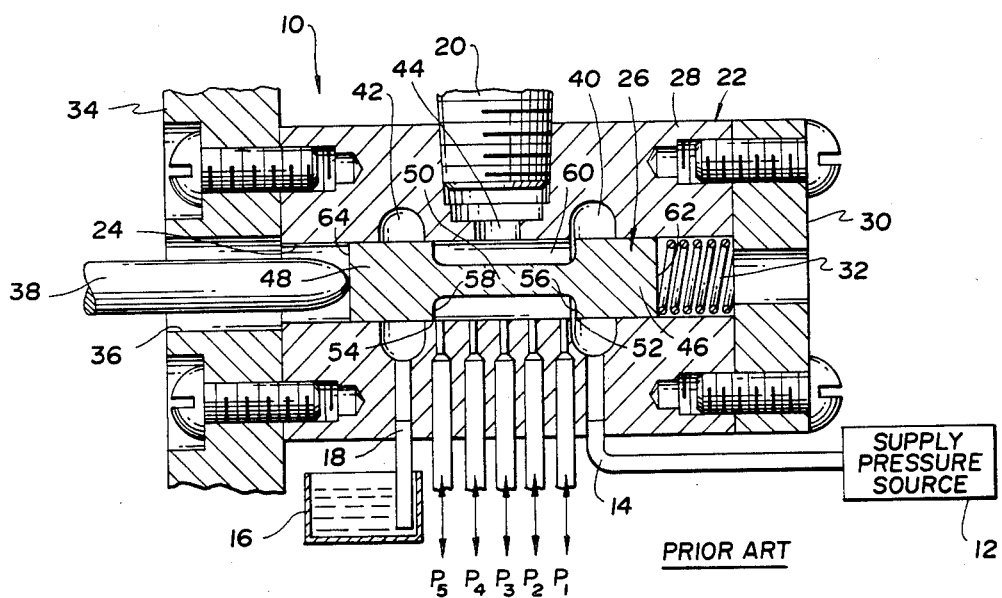
Fig. 1
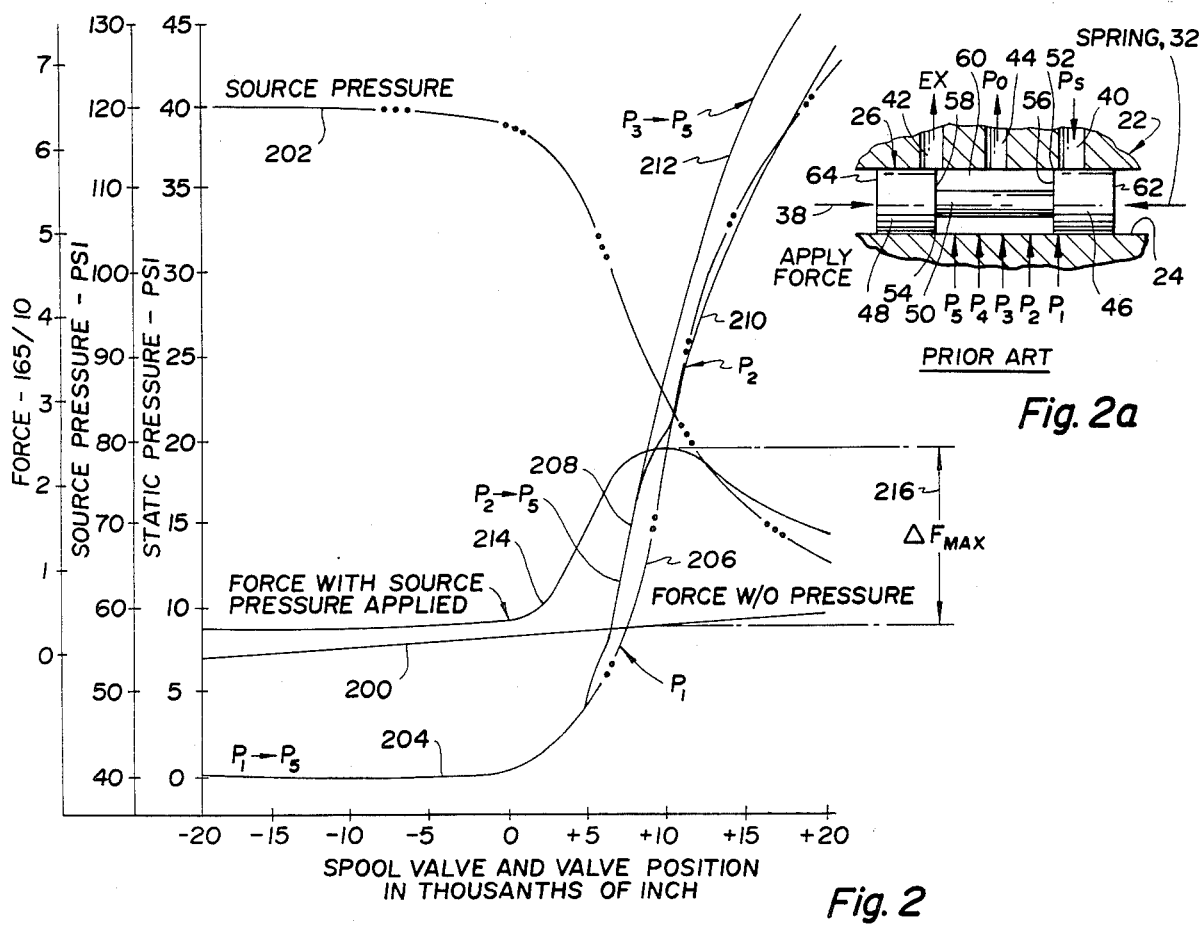
Fig. 2a
Fig. 2

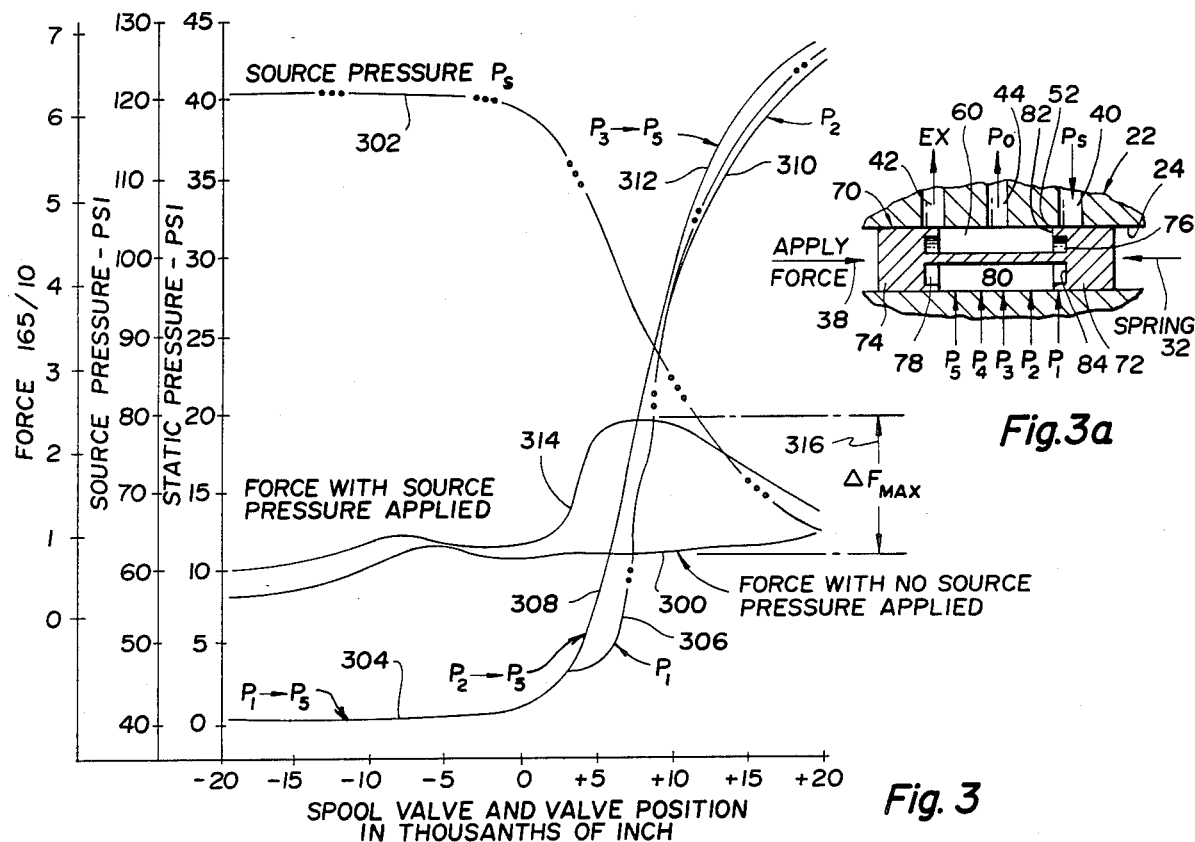
Fig. 3
Fig. 3a
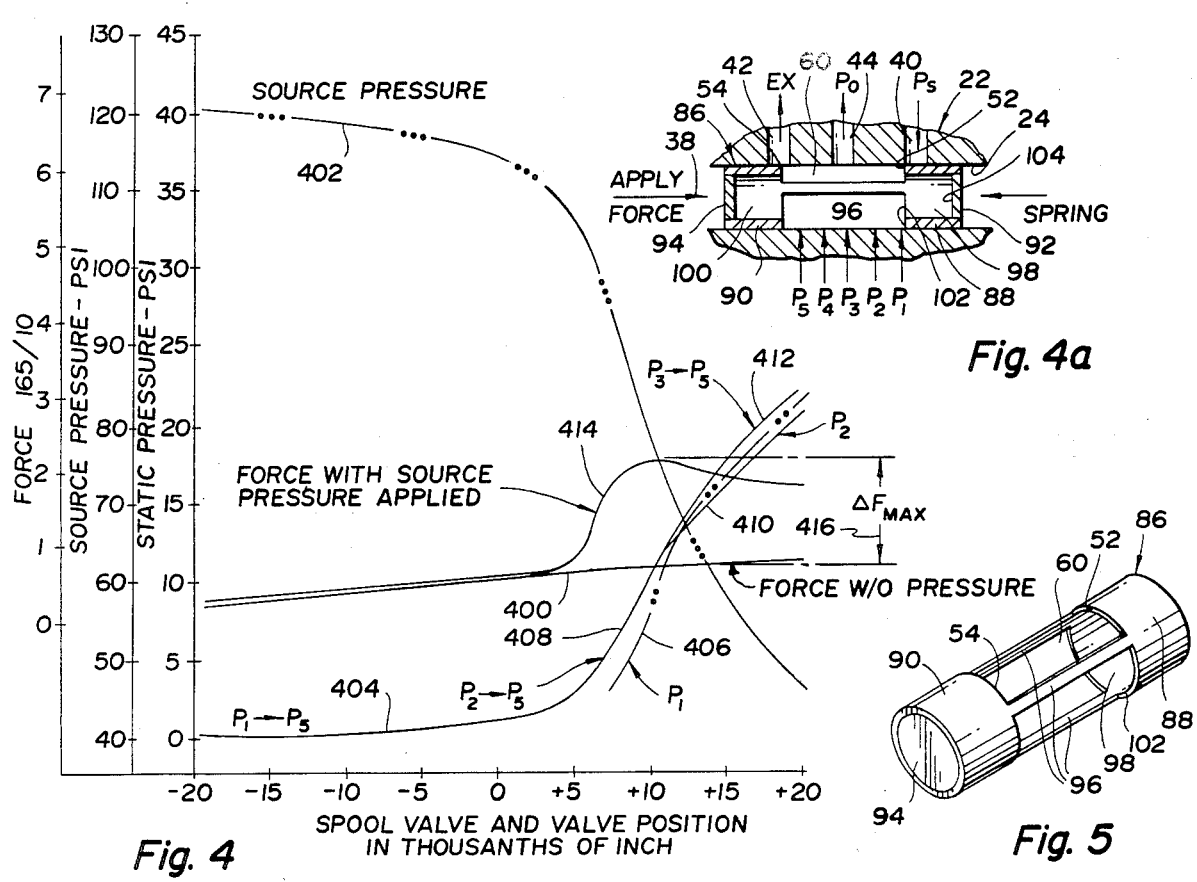
Fig. 4
Fig. 4a
Fig. 5

FLUID PRESSURE SPOOL VALVE AND METHOD OF CONTROLLING PRESSURE FORCES ACTING THEREON

The invention relates to a fluid pressure controlling spool valve and a method of controlling the pressure generated forces acting thereon. It more particularly relates to hydraulic fluid pressure spool valves of the type in which the valve lands control certain ports as the valve is moved axially in a valve housing. Such movement commonly occurs by the application of a control force to urge the valve in one direction, usually against a valve spring tending to urge the valve in the opposite direction.

The commonly used spool valve is constructed with spaced lands and grooves. Typically, the lands are shaped much like solid cylinders with a reduced diameter section of the spool valve joining the two lands and defining an annular groove between the two lands. Some valves will have more than two lands and therefore more than a single groove. For the purposes of simplifying the descriptions below, however, the prior art type spool valve and the spool valves embodying the invention herein disclosed and claimed will be considered to have a pair of spaced lands and a single groove between the lands. It is to be understood, however, and is intended that the invention as claimed below may be embodied in spool valves having three or more lands and two or more grooves.

The commonly used spool valve noted above generates a high fluid velocity at the inlet port when the edge of the land opens the port, decreasing the static pressure acting on the groove side of the land immediately adjacent the inlet port and therefore decreasing the force generated by that static pressure tending to move the land and thus the valve in the apply direction. Meanwhile, at the opposite land the velocity of the fluid is still quite low because the exhaust port is normally closed or is being closed as the inlet port is being opened. With little fluid velocity, the static pressure acting on that land is somewhat higher and therefore the total force generated by that static pressure acting across that area is considerably higher, resulting in a net force acting on the spool valve and tending to resist the apply force.

By using a spool valve embodying the invention, and the method of the invention, the velocity head created at the inlet port still decreases the static pressure head at the inlet, but this decrease in static pressure can act only on a very small effective area of the land groove side surface since most of that side surface has been moved well within the land and is not subject to the velocity head and therefore the accompanying decrease in static pressure. This means that the effective force urging that land toward the valve opening direction is more nearly equal to the force generated by the static pressure acting on the opposite land. This results in a near balance of the static pressure acting in opposite directions on the spool valve lands, with the result that there is less force resistance to the movement of the spool valve in the inlet port opening direction. This means that there is a reduction in the force opposing movement of the spool valve by a control force applied by the valve piston rod, for example, giving the desired advantages of the construction and method.

A spool valve body comprising the invention therefore has a pair of axially spaced lands having facing side walls joined by a reduced diameter section. At least one of the lands has an axially extending recess formed therein and opening toward the other of the lands to define a land-facing side wall outer annular area axially spaced from and of substantially less area than the remainder of the area of the land-facing side wall of that land. The spool valve of the invention may have each of the pair of axially spaced lands so recessed, the lands therefore being of substantially identical but mirror image construction. This will simplify the use of the spool valve as it is assembled in the valve housing because the spool valve may then be inserted in the housing bore with either land being the first inserted. It is of course understood that the spool valve of the invention may have more than two lands when more ports are to be controlled by movement of the spool valve, with at least the lands controlling the inlet port or ports being constructed and arranged to minimize the areas exposed to velocity head and a decreased static pressure head.

In practicing the method embodying the invention, the resistance to movement of a spool valve during valve actuation to control fluid pressure output from a pressure source throughout a fluid pressure output range from zero to a predetermined maximum fluid pressure output is reduced. The method involves several conventional steps which include the provision of a spool valve of the type described, generation of a fluid supply pressure and the routing of that pressure to a spool valve inlet port to obtain a controlled fluid pressure output through the output pressure port in accordance with the position of the spool valve lands and groove relative to the ports, and the moving of the spool valve to close the exhaust port with one land and to variably open the inlet port with the other land and permit fluid pressure to flow past that other land into the spool valve groove and then out through the output pressure port in accordance with the amount of output pressure desired. While the inlet port is opened the velocity pressure head is increased and therefore the static pressure head is decreased at the inlet acting on the groove side surface of the other land of the spool valve controlling the inlet port. The reduced static pressure head acts in a direction tending to move the spool valve in the valve opening direction, which is the further opening of the inlet port by the land, all the while maintaining a static pressure head on the groove side surface of the land which has closed the exhaust port, that last named static pressure head acting in a direction tending to move the spool valve in the valve closing direction. With virtually no velocity pressure head at the land which has closed the exhaust port, there is normally a resultant static pressure force distribution acting on the spool valve which substantially resists the opening movement of the spool valve which must be overcome by valve actuating force to further open the inlet port and further increase the output pressure. The method then includes the additional steps of dividing the side surface area of the other land controlling the inlet port, that side surface area defining a wall of a groove, by establishing a first minimum side surface area located immediately adjacent the inlet port and exposed to the lower static pressure head, and a second maximum side surface area. The velocity pressure head in the area of the second maximum side surface area is substantially eliminated, resulting in a corresponding increase in the static pressure head acting on that second maximum side surface area so that the static pressure head acting on the entire side surface area of the spool valve of the land controlling the inlet port closely approaches the static pressure head acting on the side surface area of the one spool valve land which has closed the exhaust port. Thus the resultant static pressure force distribution acting on the spool valve is minimally biased toward resisting spool valve opening movement. In another aspect of practicing the method of invention, the division of the side surface area of the other land into a first minimum side surface area and a second maximum side surface area is more particularly accomplished by positioning the second maximum side surface area axially away from the open part of the inlet port so as to remove the second maximum side surface area from the area where the velocity head occurs.

Some spool valves embodying the invention may have an axially located reduced diameter section joining the two lands. Others may have one or more circumferentially spaced valve bar-like sections joining the lands at their outer peripheries. Some spool valves may be machined to shape, others may be cast, and others may be formed from tubular material with appropriate openings in the sides thereof to provide the circumferentially spaced bar sections and with the outer ends of the tube section forming the spool valve being closed so that the result is the creation of recessed lands joined by a plurality of such bar sections.

In using spool valves embodying the invention and in practicing the method embodying the invention, it is the ultimate objective that the change in force required to move the valve in the valve opening or apply direction with the supply pressure applied, as compared to with no supply pressure at all being applied, is decreased in relation to the amount of force required to move the usual valve having solid cylindrical lands.

IN THE DRAWINGS

FIG. 1 is a schematic representation of a spool valve assembly with parts broken away and in section. Portions of the fluid pressure system of which the valve assembly is a part are illustrated schematically. Furthermore, the positions of several pressure probes are also illustrated so as to relate to the graphs of the latter figures.

FIG. 2 is a graph relating to the prior art spool valve of FIGS. 1 and 2a. The graph plots piston or spool valve travel and valve position against the pressure of the source or supply pressure and against the static pressures measured at the various pressure probe points illustrated in the schematic portion of the FIGS. 1 and 2a showing the spool valve and the immediate adjacent parts of its housing.

FIG. 2a is a schematic fragmentary cross-section illustration of the prior art spool valve of FIG. 1 showing the various forces and pressures used to supply the data for the graph of FIG. 2.

FIGS. 3 and 3a are similar to FIGS. 2 and 2a. FIG. 3a shows a schematic representation of a spool valve embodying the invention. FIG. 3 shows a graph generated by the data taken as the valve of FIG. 3a is actuated.

FIGS. 4 and 4a are similar to FIGS. 3 and 3a. FIG. 4a illustrates another spool valve construction embodying the invention. FIG. 4 shows a graph generated by the data obtained by the actuation of that spool valve of FIG. 4a.

FIG. 5 is a perspective view of the spool valve of the type schematically illustrated in FIG. 4a.

As noted above, FIGS. 1, 2 and 2a relate to the typical prior art spool valve in common use for controlling fluid pressures. The control valve assembly 10 is illustrated as being included schematically in a fluid pressure system which has a supply pressure source 12 connected to the inlet passage 14 of the valve assembly 10 and a reservoir or sump 16 connected with the exhaust passage 18. An output conduit 20 is suitably connected to a fluid pressure operated device, not shown.

The control valve assembly 10 includes a valve housing 22 having a valve bore 24 formed therein, and a spool valve 26 reciprocably received in the valve bore 24 for axial movement therein. The valve housing 22 is illustrated as being formed for purposes of taking data including spool valve position and pressure measurements at various pressure points to develop the information presented graphically in FIGS. 2, 3 and 4. It is to be understood that in a typical machine installation the operating environment of the valve assembly may use a different general valve housing arrangement, often provided as a part of other machine elements.

The illustrated valve housing 22 includes the housing body 28 in which bore 24 is formed, with a cap 30 secured to one end of the housing body 28 and providing a spring seat for the valve spring 32. Valve spring 32 is illustrated as a compression coil spring received in one end of the valve bore 24 and acting on one end of the spool valve 26, with spring reaction being taken on the valve seat formed by cap 30. On the other end of valve housing body 28 is a housing mount 34 which may be used to suitably mount the valve housing to an appropriate fixture or other mechanism. Mount 34 has an opening 36 therethrough which is aligned with one end of valve bore 24 and through which a push rod 38 extends from the exterior of the valve housing 22. Push rod 38 engages the other end of the spool valve 26 from valve spring 32 and is the means by which the valve apply force is applied to the spool valve against the force of the valve spring 32 to move the valve axially rightwardly as seen in FIG. 1, which is the valve opening or pressure apply increasing direction, and to permit the valve spring 32 to move the spool valve 26 leftwardly as the valve apply force is decreased or removed and therefore moving spool valve 26 leftwardly as seen in FIG. 1 toward the valve closing or pressure release direction.

Housing body 28 is somewhat schematically illustrated as having an annular inlet port 40 formed in the housing body and opening into the valve bore 24 so as to be fluid connected with inlet passage 14. A similarly provided annular exhaust port 42 is located in axially spaced relation to inlet port 40 and is connected to the exhaust passage 18. The outlet pressure port 44 is connected with the valve bore 24 axially intermediate inlet port 40 and exhaust port 42. The outlet pressure conduit 20 is connected to port 44 to receive fluid pressure therefrom and to conduct the controlled outlet pressure to a suitable device to be operated by that pressure.

The spool valve 26 of FIGS. 1 and 2a is of the typical well known type wherein the valve has a pair of lands 46 and 48 connected by a reduced diameter section 50 of the spool valve body. Lands 46 and 48 are typical in that they are formed as solid cylindrical portions of the spool valve with their valve control edges being the land edges 52 and 54, respectively. Thus the lands 46 and 48 have facing land side wall surfaces 56 and 58, respectively, with these land side wall surfaces also defining the side walls of the annular groove 60 located between the lands 46 and 48. The outer end 62 of land 46 is in engagement with valve spring 32 and the land outer end 64 of land 48 is in engaged by one end of the push rod 38. While timing variations may slightly modify the location of the valve edges in relation to the inlet and exhaust ports, in the particular arrangement disclosed the valve edge 52 does not open the inlet port 40 to the groove 60 until the valve edge 54 has closed the exhaust port 42 in relation to the annular groove 60. The spacing of the valve edges and the edges of the inlet and exhaust ports may be such that the closing of the exhaust port occurs slightly after or simultaneously with the incipient opening of the inlet port. It should be noted that the outlet pressure port 44 is in fluid communication with the annular groove 60 at all times. Therefore the fluid pressure in the outlet port 44 is the pressure within the annular groove 60. This general type of valve arrangement has been used for many years and is well known in the art, it being understood that the arrangement is somewhat schematic and that variations may be readily adopted while embodying the invention.

FIG. 1 shows the housing body 28 being provided with five pressure probes, respectively identified as $P_1$, $P_2$, $P_3$, $P_4$ and $P_5$. These pressure probe points are distributed from immediately adjacent the inlet port 40 to a point adjacent the exhaust port 42. Therefore the pressure probes provide a means for determining the static fluid pressure at each of the points where the probes intersect the valve bore 24 and open into the area of the annular groove 60. Pressures taken at the various probe points static head pressures and are plotted in the graph portions of FIGS. 2, 3 and 4 as will be further discussed below.

FIG. 2a schematically illustrates the typical prior art spool valve and FIG. 2 is a graph of data taken from the operation of that valve in an environment like that of FIG. 1. Each of the graphs in FIGS. 2, 3 and 4 has the spool valve travel and the valve position of the valve edge controlling the inlet port plotted as the abscissa and measured in thousandths of an inch. The ordinate of each graph has three scales, one being the source or supply pressure to the inlet port 40 in p.s.i., the second one being the static pressure in p.s.i. at each of the five pressure probe points, and the third one being the force required to move the spool valve from a zero valve position to a given positive valve position, measured in pounds/10. Each graph has certain forces plotted using the same abscissa and an increasing force scale following the ordinate. Since the force required to move the spool valve depends to a great extent on friction forces and the spring rate of the valve spring 32, the actual force is of less importance than the change in force. The spool valve position identified as zero on the abscissa of each graph is that position where the valve edge 52 is positioned at the edge of inlet port 40 so that as the spool valve 26 is moved rightwardly further, the inlet port 40 is being opened, and as the spool valve 26 moves leftwardly from that zero position, the inlet port 40 is being even further closed as the valve edge 52 moves further away from the inlet port. It is also to be understood that when the spool valve being used to obtain the data is in the zero valve position the exhaust port 42 is closed by the valve edge 54. Thus when the spool valve is in the negative valve position the exhaust port 42 is open, and when it is in the positive valve position the exhaust port 42 is closed and the inlet port 40 is opened to the area of annular groove 60.

For direct comparison purposes, data were taken with each of the spool valves illustrated in FIGS. 2a, 3a and 4a from a spool valve position which was twenty-thousandths of an inch closed through a spool valve position of about twenty-thousandths of an inch open, the spool valve being moved by a force being applied to the spool valve by a push rod 38 against the force of the valve spring 32 and any valve friction forces.

Each valve was run with no supply pressure being present at the inlet port 40 to determine the force required to move the valve through the positive valve travel stroke of the graph without any pressure changes of any type and that force is plotted in each graph. In the graph of FIG. 2, curve 200 represents the force exerted through push rod 38 required without any supply pressure being available. In FIG. 3, curve 300 represents this force, and in FIG. 4, curve 400 represents this force.

Curves 202 of FIG. 2, 302 of FIG. 3 and 402 of FIG. 4 respectively represent the source pressure being supplied to the inlet port 40 as the valves of FIGS. 2a, 3a and 4a are respectively moved from the minus twenty-thousandths of an inch position to the plus twenty-thousandths of an inch position by the force exerted against the spool valve 26, 70 or 86 by the push rod 38.

The data from various pressure probes were substantially identical at certain portions of the spool valve position and therefore the curves representing pressures at each of the pressure probes are combined at some portions. Where the pressure values became sufficiently different to plot, those curves have been divided into other curve segments. Therefore curve segment 204 of FIG. 2 represents the pressure values at all five pressure probe points from the spool valve position of minus twenty-thousandths of an inch to slightly more than plus five-thousandths of an inch. Comparable curve segments 304 of FIG. 3 and 404 of FIG. 4 are plotted.

The pressure at probe $P_1$ then became somewhat less than the pressure at probe points $P_2$ through $P_5$ and separate curve segments are then plotted. This curve segment for the pressure at probe point $P_1$ is identified as curve segment 206 in FIG. 2, curve segment 306 in FIG. 3, and curve segment 406 in FIG. 4. Each curve segment thereafter representing the pressures at pressure probe points $P_2$ through $P_5$ are respectively plotted as curve segment 208 in FIG. 2, 308 in FIG. 3, and 408 in FIG. 4.

As the spool valve position continues to move in the increased opening direction, the pressure at pressure probe point $P_2$ becomes somewhat less than the pressures at pressure probe points $P_3$ through $P_5$ and therefore another curve segment plots pressure at pressure point $P_2$ after this differentiation occurs. Thus curve segment 210 represents the pressure at pressure probe point $P_2$ in FIG. 2, curve segment 310 represents the pressure at pressure probe point $P_2$ for FIG. 3, and curve segment 410 represents the pressure at pressure probe point $P_2$ in FIG. 4. The static pressures at pressure probe points $P_3$ through $P_5$ continue to be substantially identical and are therefore plotted in each of FIGS. 2, 3 and 4 as curve segments 212, 312 and 412, respectively.

The force required to be applied by the push rod 38 to the spool valve to move the valve from the minus twenty-thousandths of an inch position to the plus twenty-thousandths of an inch position with a source pressure of 120 p.s.i. being supplied from pressure source 12 is plotted as curve 214 in FIG. 2, 314 in FIG. 3 and 414 in FIG. 4. The maximum difference between the force required without any supply pressure being applied and the force required with the supply pressure being applied is identified as the differential force illustrated by force differential value 216 in FIG. 2, 316 in FIG. 3 and 416 in FIG. 4. In each instance the same valve housing 22 is used as is the same valve spring 32. Only the spool valves have been modified to obtain the results plotted in FIGS. 3 and 4.

The spool valve 70 of the fragmentary view of FIG. 3a is somewhat similar to the prior art spool valve 26 of FIGS. 1 and 2a. However, the valve lands 72 and 74, corresponding to valve lands 46 and 48 of spool valve 26, have been respectively provided with recesses 76 and 78 in the land side walls which face each other, the recesses being annular about the reduced diameter section or bar 80 joining the two lands. Recess 76 therefore divides the side surface area of land 72 facing groove 60 into an outer annular area 82 and an inner annular area 84. The outer annular area 82 is preferably kept at a minimum while the inner annular area is preferably kept at a maximum consistent with appropriate strength and integrity of the spool valve construction. The inner annular area 84 is positioned at the bottom of the axially extending recess 76 and therefore is positioned axially away from the outer annular area 82. Land 74 is illustrated as being similarly constructed. It may be constructed in an identical fashion so that either land 72 or 74 may be used to control the inlet port 40 depending upon which end of the spool valve has been inserted in the bore during assembly. In some instances, land 74 may be constructed in the same manner as land 48 of spool valve 26. However, the important point is that the outer annular area 82 immediately adjacent the inlet port 40 is of a minimum area for reasons discussed below.

The spool valve 86 of FIGS. 4a and 5 is of a somewhat different construction. It also has valve lands 88 and 90 which are generally comparable to lands 72 and 74 of FIG. 3a and lands 46 and 48 of FIGS. 1 and 2a. However, the spool valve is shown as being made from a tubular member with the outer ends of the tubular member being closed by discs 92 and 94. These discs which therefore provide the outer end surfaces of the lands 88 and 90, respectively. Arcuate portions of the tube member forming the spool valve are removed from circumferentially spaced areas to leave a plurality of bars 96 which join the lands 88 and 90. Thus what has been an annular groove in the other constructions is a space contained within the tubular body between the lands 88 and 90 with the bars 96 being located on the outer periphery of that space in equal circumferentially spaced relation. Three such bars 96 are illustrated and have been found to provide sufficient valve strength. In some instances more or less bars may be provided. This construction leaves a recess 98 within land 88 opening into the space 60 and a recess 100 within land 90 also opening into that space. Land 88 has an outer annular area 102 formed by the arcuate segments of the tubular construction between each of the bars 96. It has an inner annular area 104 which is defined by the inner side of the disc 92 and located within the recess 98 so as to be axially spaced well away from area 102. Land 90 is similarly constructed and provided with similar areas.

The lands of spool valves 70 and 86 have land edges which operate as valve edges in the same manner as the valve edges 52 and 54 of spool valve 26 therefore the same reference numerals are respectively provided for the valve edges of the two lands in each of these valves. In each instance the valve edge is the outer peripheral corner of the land on which it is provided. These valve edges are annular rim-like edges which provide port control edges. The recessed spool valve land constructions of FIGS. 3a, 4a and 5 may be referred to as having cup-like lands. The recesses within the lands preferably extend through at least 20% of the axial extent of the land cylindrical sides, particularly when the spool valve is constructed as shown in FIG. 3a. It is also to be understood that when the spool valve is constructed as shown in FIGS. 4a and 5, that the axial extent of the recesses 98 and 100 cover at least 20% of the axial extent of the land cylindrical outer sides and preferably extend for a much greater proportion thereof. In all events, the recess area must be axially removed from the outer annular area a sufficient distance to achieve the purposes of the invention. Each of the outer annular areas of the lands facing the groove 60 also referred to as annular rim-like edges, preferably has an effective axially facing area which is between about 5% and 20% of the full cross-section area of the land of which it is a part. Likewise, the totally effective cross-section area of the bar 80 or the bars 96 should be between about 5% and 20% of the full cross-section area of each land to which the bar or bars are joined. It can be seen that when the axially disposed bar 80 is used, its effective cross-section area where it joins land 72, for example, should be no more than 20% of the cross-section area of land 72. Likewise the outer annular area 82, which is the annular rim-like edge of the land, should have an effective area no more than 20% of the full cross-section area of land 72. It can therefore be seen that under this condition the inner annular area 84 of land 72 should therefore be at least 60% of the full cross-section area of land 72. If the effective cross-section area of bar 80 and the effective axially facing area of outer annular area 82 are at the minimum amounts, they will each occupy about 5% of the full cross-section area of land 72 and therefore the area 84 would be as much as 90% of the full cross-section area of that land. The same arrangement is true with regard to the spool valve construction of FIGS. 4a and 5. Thus the effective axially facing area of land area 102 should be between 5% and 20% of the full cross-section area of land 88 and the total effective cross-section area of the bar 96, three such bars being shown should total between 5% and 20% of the full cross-section area of land 88. Again, the inner area 104 at the bottom of recess 98 would therefore be before 60% and 90% of the full cross-section area of land 88. It is to be understood that the outer side facing area 82 of land 72 in FIG. 3a or 102 in FIGS. 4a and 5 should be at a minimum area consistent with providing sufficient strength to the valve construction, and that the area 84 of land 72 in FIG. 3a and the area 104 of the end 88 in FIGS. 4a and 5 should be at a maximum for reasons noted below.

When the spool valve is moved rightwardly as seen in the drawings until the valve position is past the zero position of the graphs and therefore is opening the inlet port 40, fluid under the supply pressure to the inlet port flows past the edge of the inlet port and the valve edge 52 at some velocity. The total pressure head at this point does not change appreciably, but much of the pressure head is changed to velocity head, which effectively lowers the static pressure head as the fluid flows past the valve edge 52. This static pressure head is measured by pressure probe $P_1$. As the fluid flows into the groove or space 60, which is already assumed to be filled with fluid, it flows with much less velocity because it has entered a relatively large volume area in relation to the cross-section area of the valve opening established by the valve edge 52 and the edge of inlet port 40. Likewise it continues to flow through the outlet pressure port 44. Therefore the static pressure tends to increase and the velocity pressure head tends to decrease as the fluid moves further away from the inlet being controlled by valve edge 52. These static pressure heads are measured by pressure probes $P_2$, $P_3$, $P_4$ and $P_5$, with pressure probe $P_5$ measuring the static pressure head near the land which has closed the exhaust port 42. The pressure forces acting on the spool valve lands in opposite directions are generated by the static pressure heads acting on those lands.

It has been found that when the typical prior art spool valve land construction of FIGS. 1 and 2 is used, there is a large land area facing the groove 60 which is exposed to a combination of velocity pressure head and static pressure head. Since the total pressure is made up of these two pressure heads, and only the static pressure head exerts the pressure force on the land area, it follows that the force generated by the static pressure head acting on the land area 56 of land 46 in FIGS. 1 and 2a over a relatively large area is considerably less than the force generated by the static pressure head acting on the area 58 of land 48, where there is virtually no velocity head and the pressure is therefore substantially all a static pressure head. This creates an unbalance of pressure-generated forces tending to move the spool valve 26 leftwardly against the push rod 38 and therefore increasing the force resisting movement of the valve toward the open position, which force must be overcome by additional force exerted by the push rod 38 on the spool valve in order to further open the inlet port 40 and to allow a greater outlet pressure to be delivered through port 44 to conduit 20 and therebeyond. As shown in FIG. 2, the force with the source pressure applied to the inlet port peaks at a point where the difference between it and the force to move the valve to that same position without any source pressure being applied is at a maximum of approximately 0.210 pounds. This maximum differential force is identified by reference character 216.

When the static pressure head and the velocity pressure head are generated by positioning the spool valve 70 of FIG. 3a so that the inlet port 40 is being opened, the decreased static pressure head acting on area 82 has a much smaller area to act on than it did in the prior art valve of FIGS. 1 and 2a. There is substantially no velocity head pressure acting on the recessed area 84 so that all of the pressure acting thereon, or substantially all of it, is a static pressure head of about the same value as a static pressure head acting on the other land 74. The results obtained by use of the valve construction of FIGS. 4a and 5 are somewhat similar. Decreasing the area exposed to the smaller static pressure head which, has been decreased because of the creation of a velocity pressure head, in relation to the area exposed primarily to a static pressure head without a velocity pressure head, results in a smaller force unbalance tending to urge the spool valve 70 or 86 leftwardly as seen in the drawings against the apply force exerted through the push rod 38.

As shown in FIG. 3, the maximum force differential 316 is approximately 0.166 pounds of force as compared to 0.210 pounds of force in the graph of FIG. 2. In the graph of FIG. 4 the maximum force differential 416 is about 0.140 pounds of force. It can therefore be seen that the valve construction of FIG. 3a results in approximately a 21% decrease in the amount of force that must be added to the push rod 38 to overcome the unbalance of forces caused by the particular valve construction, comparing the prior art spool valve 26 with the spool valve 70 embodying the invention. Similarly, the maximum force differential required when using the valve construction of FIGS. 4a and 5 is approximately 66% that of the maximum force differential required when using the prior art valve construction of FIGS. 1 and 2a.

The greater effectiveness of the valve construction of FIGS. 4a and 5 in relation to that of FIG. 3a is primarily attributed to the fact that the outer annular area 82 of FIG. 3a is a larger percentage of the total effective area of the land than is the outer area 102 in relation to the total effective area of land 88. In other words, the construction in FIG. 3a approaches the lower desired limits wherein the recessed area 84 of land 72 in FIG. 3a is only about 60% of the total effective cross-section area of land 72, while the area 104 of land 88 in FIGS. 4a and 5 is about 90% of the total effective cross-section area of land 88. Thus, using these ranges as approximations, by use of the invention anywhere from 20% to about 33% of the unbalanced force which must be overcome be force exerted by the push rod 38 may be eliminated as compared to the typical prior art spool valve.

The embodiments of the invention in which an exclusive property or privilege is claimed are defined as follows:

1. A spool valve adapted for controlling fluid pressure and flow through a plurality of axially spaced ports in a valve housing having an inlet port and an exhaust port and an outlet port, said spool valve having a valve body formed by a pair of axially aligned and spaced cup-like lands having oppositely disposed closed ends and cylindrical sides, said cylindrical sides having annular rim-like edges providing port control edges extending axially toward each other and adapted to control the inlet port and the exhaust port, the axial space between said lands being adapted to be continuously fully connected with the outlet port, and at least one axially extending bar section of substantially less cross section area than the full cross section area of each of said lands, said at least one bar section extending to and joining said cup-like land to form therewith a unitary valve body.

2. The spool valve of claim 1 wherein said at least one bar section is a single bar section positioned in axial alignment with said lands and joining said lands at said closed ends.

3. The spool valve of claim 1 wherein said at least one bar section includes a plurality of bar sections positioned in axial alignment with said lands and with all of said bar sections joining said lands at said annular rim-like edges.

4. The spool valve of claim 1 wherein said at least one bar section includes a plurality of bar sections positioned in circumferentially equi-spaced relation in axial alignment with said lands and with all of said bar sections joining said lands at said annular rim-like edges.

5. The spool valve of claim 1 wherein each of said annular rim-like edges has an effective axially facing area whcih is between about 5% and 20% of the full cross section area of the land of which it is a part and the total effective cross section area of said at least one bar section is between about 5% and 20% of the full cross section area of each land to which it is joined.

6. The method of reducing resistance to movement of a spool valve during valve actuation to control fluid pressure output from a pressure source throughout a fluid pressure output range from zero output to a predetermined maximum fluid pressure output, said method comprising the conventional steps of:

(a) providing a spool valve adapted to be moved axially, an inlet pressure port, an exhaust port and an outlet pressure port to be controlled by the axial position of the spool valve, the spool valve having axially opposed lands separated by a groove with the facing side surface areas of the lands forming the side walls of the groove, one of the opposed lands being associated with the exhaust port and the other being associated with the inlet port, the normally open output pressure port being in continuous fluid pressure communication with the spool valve groove;

(b) generating a fluid supply pressure and routing same to the spool valve inlet port to obtain a controlled fluid pressure output through the output pressure port in accordance with the position of the spool valve lands and groove relative to the inlet and exhaust ports;

(c) moving the spool valve to close the exhaust port with the one land, and to variably open the inlet port with the other land and permit fluid pressure to flow past the other land into the groove and then out through the output pressure port in accordance with the amount of output pressure desired; and (d) while the inlet port is open increasing the velocity pressure head and therefore decreasing the static pressure head at the inlet acting on the groove side surface of the spool valve other land, the reduced static pressure head acting in a direction tending to move the spool valve in the valve opening direction, all the while maintaining a static pressure head on the groove side surface of the one land in a direction tending to move the spool valve in the valve closing direction, with virtually no velocity pressure head at the one land, normally resulting in a static pressure force distribution acting on the spool valve substantially resisting opening movement of the spool valve which must be overcome to further open the inlet port and further increase the output pressure; said method then comprising the additional steps of:

(e) dividing the side surface area of the other land defining a groove wall by establishing a first minimum side surface area located immediately adjacent the inlet port and exposed to the lower static pressure head, and a second maximum side surface area;

(f) and substantially eliminating the velocity pressure head in the area of the second maximum side surface area and correspondingly increasing the static pressure head acting on the second maximum side surface area so that the static pressure head acting on the entire side surface area of the spool valve other land controlling the inlet port closely approaches the static pressure head acting on the side surface area of the one spool valve land, the resultant static pressure force distribution acting on the spool valve therefore being minimally biased toward resisting spool valve opening movement.

7. The method of reducing resistance to movement of a spool valve during valve actuation to control fluid pressure output from a pressure source throughout a fluid pressure output range from zero output to a predetermined maximum fluid pressure output, said method comprising the conventional steps of:

(a) providing a spool valve adapted to be moved axially, an inlet pressure port, an exhaust port and an outlet pressure port to be controlled by the axial position of the spool valve, the spool valve having axially opposed lands separated by a groove with the facing side surface areas of the lands forming the side walls of the groove, one of the opposed lands being associated with the exhaust port and the other being associated with the inlet port, the normally open output pressure port being in continuous fluid pressure communication with the spool valve groove;

(b) generating a fluid supply pressure and routing same to the spool valve inlet port to obtain a controlled fluid pressure output through the output pressure port in accordance with the position of the spool valve lands and groove relative to the inlet and exhaust ports;

(c) moving the spool valve to close the exhaust port with one land, and to variably open the inlet port with the other land and permit fluid pressure to flow past the other land into the groove and then out through the output pressure port in accordance with the amount of output pressure desired; and (d) while the inlet port is open increasing the velocity pressure head and therefore decreasing the static pressure head at the inlet acting on the groove side surface of the spool valve other land, the reduced static pressure head acting in a direction tending to move the spool valve in the valve opening direction, all the while maintaining a static pressure head on the groove side surface of the one land in a direction tending to move the spool valve in the valve closing direction, with virtually no velocity pressure head at the one land, normally resulting in a static pressure force distribution acting on the spool valve substantially resisting opening movement of the spool valve which must be overcome to further open the inlet port and further increase the output pressure;

said method then comprising the additional steps of:

(e) dividing the side surface area of the other land defining a groove wall by establishing a first minimum side surface area located immediately adjacent the inlet port and exposed to the lower static pressure head, and a second maximum side surface area recessed into the other land so as to be positioned axially away from the first minimum side surface area and from the open part of the inlet port;

(f) and substantially eliminating the velocity pressure head in the area of the second maximum side surface area and correspondingly increasing the static pressure head acting on the second maximum side surface area so that the static pressure head acting on the entire side surface area of the spool valve other land controlling the inlet port closely approaches the static pressure head acting on the side surface area of the one spool valve land, the resultant static pressure force distribution acting on the spool valve therefore being minimally biased toward resisting spool valve opening movement.

8. The method of providing a substantially pressure balanced spool valve comprising the steps of:

(a) establishing opposed valve areas subject to static pressure of fluid under pressure being controlled by the spool valve;
(b) exposing one of the opposed valve areas to a first static pressure head and virtually no velocity pressure head;
(c) exposing a first part of the other of the opposed valve areas to a velocity pressure head and a second static pressure head which in sum are equal to the first static pressure head, and exposing a second part of the other of the opposed equal valve areas only to a third static pressure head which is equal to the first static pressure head;
(d) and decreasing the first part of the other valve area exposed to the velocity pressure head and the second static pressure head to a minimum area while maximizing the area of the second part of the other of the valve areas exposed to the third static pressure head so that the numerical sum of forces urging the valve in one axial direction generated by the first static pressure head acting across the one opposed equal valve area is substantially equal to the numerical sum of forces urging the valve in the opposite axial direction generated by the second and third static pressure heads acting respectively across the first and second parts of the other equal valve area throughout the pressure range being controlled by the valve, substantially eliminating the unbalance of the opposed sums of forces acting on the valve and generated by static pressure heads.

9. The method of providing a substantially pressure balanced spool valve comprising the steps of:
(a) establishing opposed equal valve areas subject to static pressure of fluid under pressure being controlled by the spool valve;
(b) exposing one of the opposed equal valve areas to a first static pressure head and virtually no velocity pressure head;
(c) exposing a first part of the other of the opposed equal valve areas to a velocity pressure head and a second static pressure head which in sum are equal to the first static pressure head, and exposing a second part of the other of the opposed equal valve areas only to a third static pressure head which is equal to the first static pressure head;
(d) and decreasing the first part of the other equal valve area exposed to the velocity pressure head and the second static pressure head to a minimum area while maximizing the area of the second part of the other of the equal valve areas exposed to the third static pressure head so that the numerical sum of forces urging the valve in one axial direction generated by the first static pressure head acting across the one opposed equal valve area is closely approached by the numerical sum of forces urging the valve in the opposite axial direction generated by the second and third static pressure heads acting respectively across the first and second parts of the other equal valve area, substantially decreasing the unbalance of the opposed sums of forces acting on the valve and generated by static pressure heads.

* * * * *